US010260630B2

(12) United States Patent
Carfi et al.

(10) Patent No.: US 10,260,630 B2
(45) Date of Patent: Apr. 16, 2019

(54) PLUNGER WITH ION NITRIDING TREATMENT FOR A HYDRAULIC FRACTURING PUMP AND A METHOD FOR MAKING SAID PLUNGER

(71) Applicants: YPF TECNOLOGIA SA, Ciudad Autonoma de Buenos Aires (AR); IONAR SA, Prov. de Buenos Aires (AR)

(72) Inventors: Guillermo Rodolfo Carfi, Ciudad Autonoma de Buenos Aires (AR); Pablo Gabriel Cirimello, Ciudad Autonoma de Buenos Aires (AR); Amado Cabo, Provincia de Buenos Aires (AR)

(73) Assignees: YPF TECNOLOGIA SA, Autónoma de Buenos Aires (AR); IONAR SA, Prov. de Buenos Aires (AR)

( * ) Notice: Subject to any disclaimer, the term of this patent is extended or adjusted under 35 U.S.C. 154(b) by 149 days.

(21) Appl. No.: 15/273,219

(22) Filed: Sep. 22, 2016

(65) Prior Publication Data
US 2017/0082194 A1 Mar. 23, 2017

Related U.S. Application Data

(60) Provisional application No. 62/221,793, filed on Sep. 22, 2015.

(51) Int. Cl.
*F16J 1/01* (2006.01)
*F04B 53/14* (2006.01)
*F16J 1/00* (2006.01)
*C21D 9/00* (2006.01)
*C21D 1/18* (2006.01)
*C23C 8/38* (2006.01)
*C23C 8/80* (2006.01)
*F04B 15/02* (2006.01)
*F04B 47/02* (2006.01)

(52) U.S. Cl.
CPC ........ *F16J 1/01* (2013.01); *C21D 1/18* (2013.01); *C21D 9/0068* (2013.01); *C23C 8/38* (2013.01); *C23C 8/80* (2013.01); *F04B 15/02* (2013.01); *F04B 47/02* (2013.01); *F04B 53/14* (2013.01); *F16J 1/001* (2013.01)

(58) Field of Classification Search
CPC .......... C21D 9/0068; C23C 8/38; F04B 53/14
See application file for complete search history.

(56) References Cited

U.S. PATENT DOCUMENTS 3,728,051 A * 4/1973 Humbert ................ C23C 8/38
148/210
4,878,815 A * 11/1989 Stachowiak ........ F04B 53/1025
137/454.4
6,105,374 A * 8/2000 Kamody ................. C21D 6/04
148/577
6,212,997 B1 * 4/2001 McCollough ......... F04B 53/144
417/554

(Continued)

*Primary Examiner* — Thomas E Lazo
(74) *Attorney, Agent, or Firm* — Muncy, Geissler, Olds & Lowe, P.C.

(57) ABSTRACT

Steel plungers for hydraulic fracturing pumps having enhanced surface hardness properties, preferably made of alloyed steel and a method for manufacturing said plungers, comprising an ion nitriding process.

15 Claims, 5 Drawing Sheets

(56) References Cited

U.S. PATENT DOCUMENTS

| | | | | |
|---|---|---|---|---|
| 6,235,128 B1* | 5/2001 | Chang | ............. | C23C 8/32 |
| | | | | 148/218 |
| 2002/0081208 A1* | 6/2002 | Thompson | ............. | F04B 53/00 |
| | | | | 417/53 |
| 2005/0238877 A1* | 10/2005 | Mori | ............. | B32B 9/00 |
| | | | | 428/408 |
| 2008/0019854 A1* | 1/2008 | Haertl | ............. | F04B 53/14 |
| | | | | 417/545 |
| 2008/0029305 A1* | 2/2008 | Skaff | ............. | E02D 29/0258 |
| | | | | 175/57 |
| 2012/0037111 A1* | 2/2012 | Scharp | ............. | B23K 20/129 |
| | | | | 123/193.6 |
| 2012/0091663 A1* | 4/2012 | Pelsoeczy | ............. | C22C 38/34 |
| | | | | 277/443 |
| 2012/0315453 A1* | 12/2012 | Cha | ............. | C23C 8/80 |
| | | | | 428/216 |
| 2015/0035234 A1* | 2/2015 | Rabhi | ............. | F04B 53/143 |
| | | | | 277/447 |

* cited by examiner

PLUNGER WITH ION NITRIDING TREATMENT FOR A HYDRAULIC FRACTURING PUMP AND A METHOD FOR MAKING SAID PLUNGER

CROSS REFERENCE TO RELATED APPLICATIONS

This application claims priority of U.S. Provisional Application No. 62/221,793 filed on 22 Sep. 2015 under 35 U.S.C. § 119(e), the entire contents of all of which are hereby incorporated by reference.

FIELD OF THE INVENTION

The present invention relates to a plunger, and a method for producing a plunger, for a hydraulic fracturing pump having enhanced surface hardness properties. Said enhanced surface hardness properties are obtained by providing said plunger with an ion nitriding surface treatment.

BACKGROUND OF THE INVENTION

In oil well hydrocarbon extraction, hydraulic fracturing, also referred to as "fracking", is a good stimulation technique in which pressurized fracture liquid is pumped into an oil well in order to increase the extraction rate of oil and/or gas by fracturing rock formations. Since hydraulic fracturing increases reservoir pressure and permeability, it allows for the extraction of oil and gas from much deeper reservoirs than conventional extraction means. Hydraulic fracturing is also used in the extraction of unconventional oil and gas reservoirs through the fracture of shale rocks.

Hydraulic fracturing uses a fracturing fluid which is typically a water-based slurry comprising a proppant and chemical additives. The proppant is a solid additive that keeps the cracks-that are formed on the rocks by hydraulic pressure—from closing. The proppant is present usually as 1% to 10% of the volume of the hydraulic fluid. Typical proppants include sand, gel, ceramics, sintered bauxite and foams.

This hydraulic fracturing fluid is pumped into the wellbore by a high-pressure reciprocating pump comprising a plunger powered by a crank mechanism. During operation, the pressure inside the pump chamber, can reach up to or over 15,000 psi, depending on the injection rates and well characteristics. The surfaces of the chamber in sliding contact with the plunger are sealed. However, considering that the fluid being pumped into the well is a high pressure slurry composed of both liquid and fluid components, and that the plunger is operating with a reciprocating motion, it is possible that a proppant particle would eventually penetrate the interstice between the plunger surface and the seal, thus causing permanent damage to the surface of said plunger on subsequent reciprocating motions. As such, solid particles lodged in the interstice of the seal are the main cause of surface damage to the plunger in hydraulic fracturing fluid pumps. Damage to the plunger is further exacerbated by localized removal of the protective surface coatings in heavily damaged areas, thereby resulting in corrosion of the substrate.

In an effort to prevent or reduce the damage caused to the surface of the plunger during operation, the same can be subjected to one or more surface protection treatments such as a protective surface coating.

Typically, said protective surface coating is a material deposition coating applied via a thermal spray, such as HVOF (High Velocity Oxygen Fuel), in which a high velocity jet of combustion gas at high temperature carrying partially molten metallic, ceramic or polymeric particles is projected against a surface to be treated. Said particles strike and adhere to the surface of the metallic substrate and nearby deposited particles form a thin, interconnected coating layer. Since the metallic substrate is at a lower temperature than the projected particles, the coating cools rapidly and contracts, mechanically securing itself on the metallic substrate.

While this form of protective coatings does indeed enhance the surface hardness compared to an untreated pump plunger, both the coating and the associated process also introduce other problems and defects that undermine the effectiveness of this type of protections.

HVOF protective coatings comprise the deposition of external material onto a substrate, and as such, there is no metallurgic continuity between the substrate and the coating. Therefore, there is an interface between the outer coating and the metallic substrate, and in the case that the coating is of the multilayer type, there are interfaces between subsequent layers. Scanning electron microscope analysis of said interfaces reveals adherence deficiencies between the metallic substrate and the coating. These adherence deficiencies may allow fluids to enter through pores in the coating, producing corrosion in the layer-substrate interface. Also, adherence deficiencies may cause a deterioration of the hard layer, so, in some regions the substrate is exposed to the abrasive fluid. Furthermore, the heating and cooling of the substrate as a result of the application of one or more coating cycles causes an increase in the grain size of the metallic substrate at the interface, resulting in the outer layers of the substrate having reduced toughness and hardness.

Additionally, the multiple coating layers may be heterogeneous, each one having different chemical composition and mechanical properties than the others, introducing superficial stresses between layers, giving rise to the phenomena of stress corrosion cracking (SSC), and widespread debonding between layers and the substrate it is meant to protect.

Therefore, there exists a need for a hydraulic fracturing pump plunger with improved surface hardness, but wherein the surface protection process, coating or treatment does not compromise the metallic structure integrity nor introduces new mechanical or technical problems.

BRIEF DESCRIPTION OF THE INVENTION

With the aim of solving the problem described above, it is an object of the present invention to provide a plunger for a hydraulic fracturing pump that is subjected to an ion nitriding process, said plunger having improved surface hardness without structural discontinuity or interfaces between the treated surface and the substrate and no increase in grain size.

Therefore, it is an object of the present invention a plunger for a hydraulic fracturing pump, wherein the plunger is a steel plunger treated with an ion nitriding process.

In a preferred embodiment of the present invention, the steel is alloyed steel, like AISI H13, DIN 34CrAlNi 7, SAE-AISI 4000 series steels or an equivalent thereof.

In a yet preferred embodiment of the present invention, the SAE-AISI 4000 series steel is a SAE-AISI 4140.

In a more preferred embodiment of the present invention the alloyed steel is quenched and tempered, and may be subjected to a double-tempering treatment.

In a yet preferred embodiment of the present invention the plunger further comprises a physical vapor deposition (PVD) surface treatment.

In a preferred embodiment of the present invention the PVD coating is about 5 μm thick.

In a more preferred embodiment of the present invention the PVD coating is a monolayer coating of certain chemical elements such as Al, Cr, Ni among others It is also an object of the present invention a method for manufacturing a plunger for a hydraulic fracturing pump, where the method comprises carrying out a surface treatment of a steel plunger by means of a ion nitriding process.

In a preferred embodiment of the method of the present invention the steel plunger is made of alloyed steel like AISI H13, DIN 34CrAlNi 7, SAE-AISI 4000 series steel, or an equivalent thereof, more preferably subjected to a double-tempering treatment.

In a more preferred embodiment of the method of the present invention, the SAE-AISI 4000 series steel is an SAE-AISI 4140 steel, most preferably subjected to a double-tempering treatment.

In a yet preferred embodiment of the method of the present invention following the ion nitriding process, the piston is subjected to a PVD surface treatment, preferably up to 5 μm thick.

In a more preferred embodiment of the method of the present invention the PVD coating is a monolayer coating of chemical elements such as Al, Cr, Ni among others

DETAILED DESCRIPTION OF THE INVENTION

The hydraulic fracturing pump plunger with ion nitriding treatment of the present invention and the method for making the same will now be described in detail with reference to the accompanying drawings.

Figure 1:
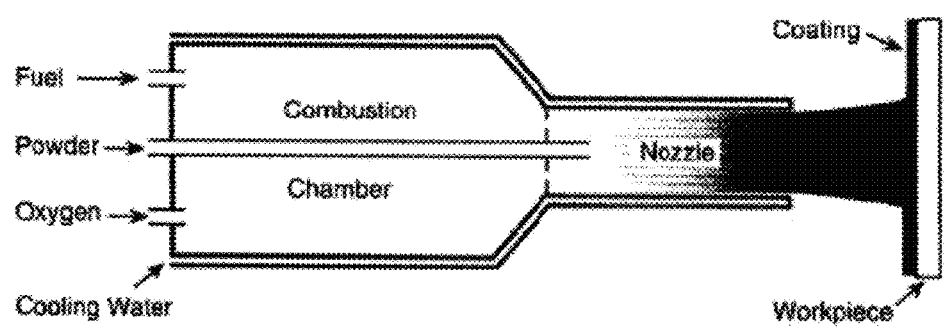
FIG. 1 shows a prior art HVOF coating treatment of a metallic substrate
Figure 2:
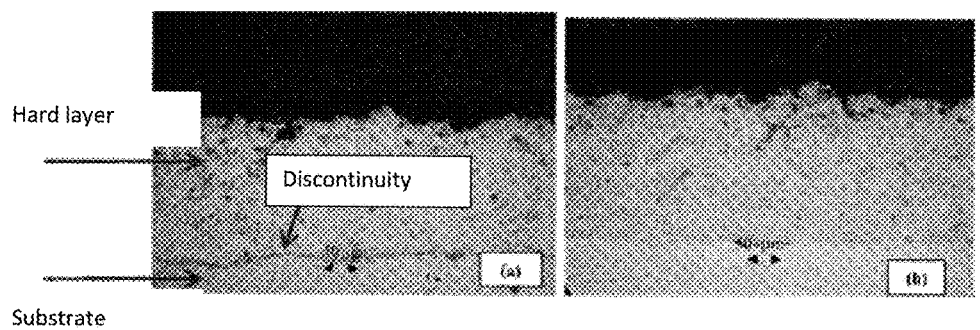
FIG. 2 is a magnified microphotograph of a polished sample of a prior art plunger substrate with a HVOF coating, showing visible discontinuity between metallic substrate and the coating.
Figure 4:
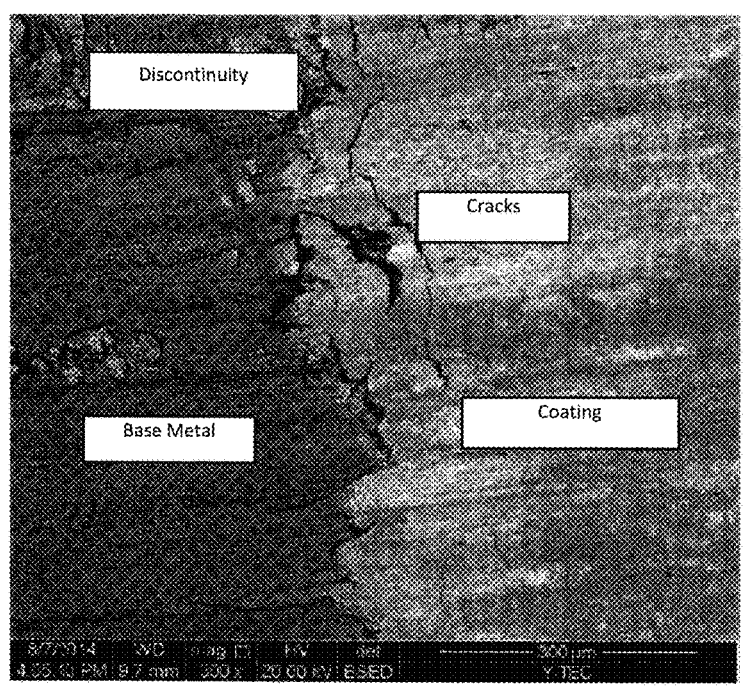
FIG. 4 is a scanning electron microscopy (SEM) image of a prior art plunger substrate coated with a HVOF coating, showing visible adherence defects between the coating and the substrate.

As previously described, HVOF protective coating treatments used in prior art plungers comprise the deposition of external material by means of thermal deposition as illustrated in FIG. 1 (ASM Handbook, Vol. 5, Surface Engineering, ASM International, 1994). With this technique the resulting plunger has no metallurgic continuity between the substrate and the coating, that is to say, there is an interface between the outer coating and the metallic substrate, as can be appreciated in FIG. 2. This results in adherence deficiencies between the metallic substrate and the coating, as seen in FIG. 4.

Figure 3:
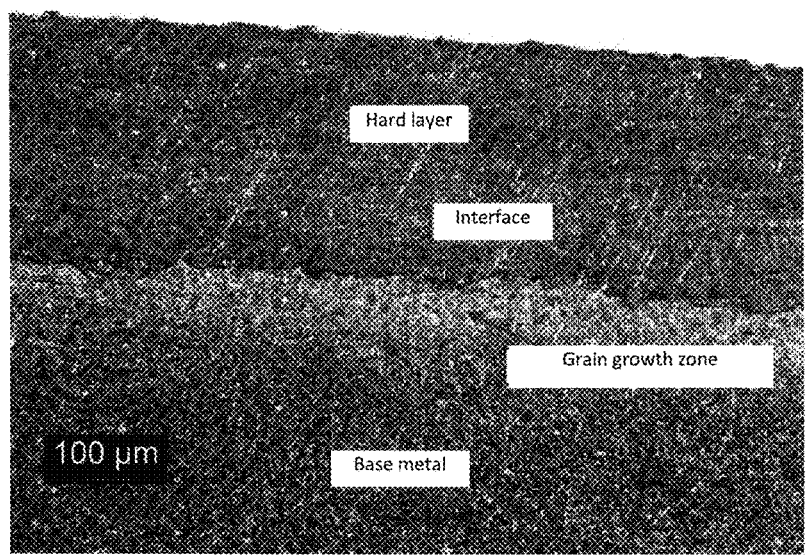
FIG. 3 is a magnified microphotograph of a prior art polished sample of a plunger substrate coated with a HVOF coating, showing visible grain growth near the interface with the coating.

Additionally, the steps of heating and cooling of the substrate applied in one or more coating cycles cause an increase in the grain size of the metallic substrate at the interface, as can be appreciated in FIG. 3. This grain size increase results in the outer layers of the substrate having reduced toughness and hardness.

With the aim of solving these problems, it is an object of the present invention to provide a steel plunger for a hydraulic fracturing pump comprising a treatment for enhancing its superficial hardness which does not produce discontinuity in the metallic structure of the metal substrate, nor produces grain size growth. In particular, it is an object of the present invention to provide a steel plunger for a hydraulic fracturing pump, provided with an ion nitriding treatment, which provides said plunger with enhanced surface hardness properties.

Base Material:

The accurate selection of the base material for the plunger of the present invention is of the outmost importance given that the response of the base material depends upon the presence of nitride-forming elements.

As a way of example, when carbon steel is nitrided, the hardness of the layer is not higher than that of the core, since no further alloy elements are present which are capable to combine themselves with the available nitrogen in order to form nitrides for a potential hardening by precipitation. The chemical elements having a greater tendency to form nitrides, i.e., those which are desired for providing hardening by nitride formation, are Al, Cr, Mo, V and W.

Figure 7:
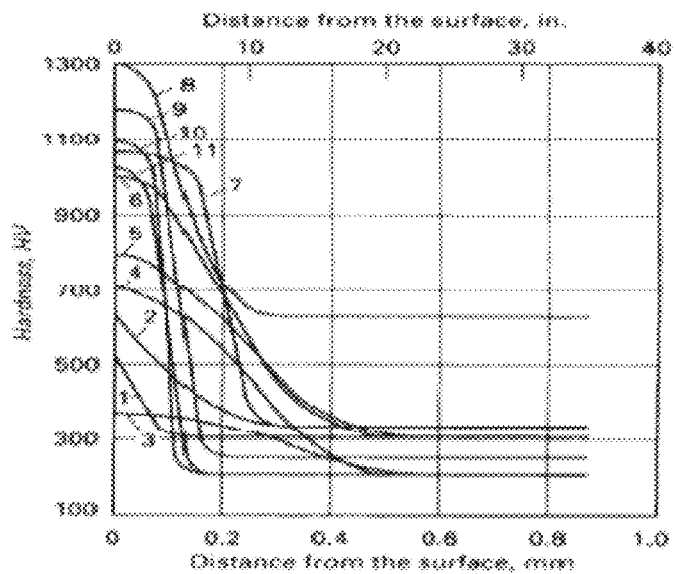
FIG. 7 shows a comparison between hardness profiles of various ion-nitride materials.

FIG. 7 shows comparative hardness curves for different steels (ASTM E 384-11, Standard Test Method for Knoop and Vickers Hardness of Materials, ASTM International, 2011). Among these materials, an alloyed steel having certain amount of alloy elements such as Cr, V and Mo, has been selected as the base material for an embodiment of the plunger of the present invention.

The best base microstructure for these types of applications is tempered martensite, hence, the base metal shall be subjected to a thermal treatment of quenching and tempering. The tempering is a thermal treatment carried out for improving the metal toughness after quenching. In the case of steel for machines, the class of steel to which the selected material, i.e. alloyed steel, belongs, it is important to consider the possible incidence of secondary hardening or precipitation of alloy carbides at the high temperatures of the tempering process. It is possible to apply a double-, even triple-, tempering treatment for assuring an enhanced toughness after the microstructural changes induced by the first tempering process.

Figure 8:
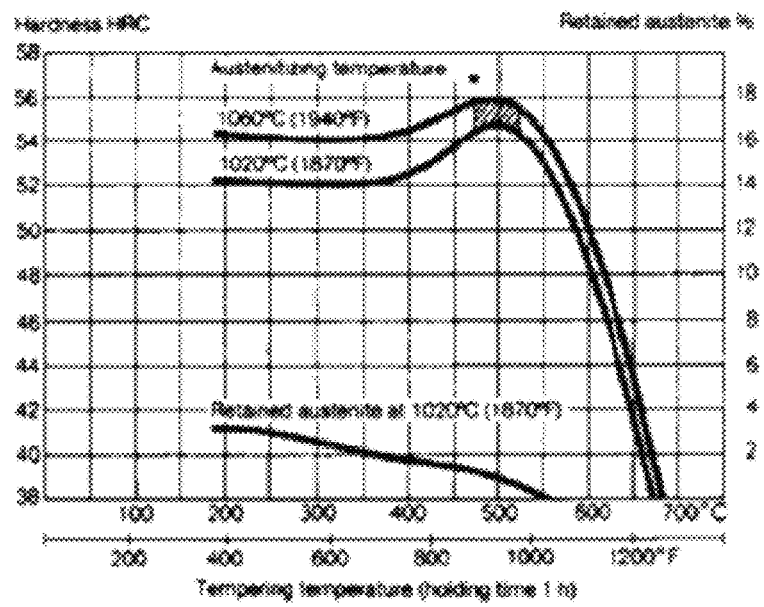
FIG. 8 shows a tempering profile for AISI H13 alloyed steel used in the preferred embodiments of the present invention.

FIG. 8 illustrates the hardness profiles as a function of the temperature of a preferred alloyed steel, AISI H13, subjected to tempering treatment (ASTM E 140-12b, Standard Hardness Conversion Tables for Metals Relationships Among Brinell Hardness, Vickers Hardness, Rockwell Hardness, Superficial Hardness, Knoop Hardness, Sclerope Hardness and Leeb Hardness, ASTM International, 2012).

Austenite in high-alloy steel for machines is very stable and does not completely transform until the temperature exceeds 500° C. On the other hand, in the particular case of alloyed steel tempered at temperatures between 475° C. and 535° C., it is possible that substantially flat and thick carbides be produced, which results in a reduced toughness to impact. To that end, a double-tempering treatment would tend to spheroidize interlaminar carbides formed by transformation of tempered austenite and reduce the detrimental effect thereof.

Therefore, a double-tempered alloyed steel is preferred as the base material for the plunger of the present invention.

Ion Nitriding:

The ion nitriding technique is a surface hardening method that produces a change in the microstructure of a metal substrate, resulting in a localized hardening, but maintaining the continuity in the metallurgic structure between the substrate core and its surface.

Figure 5:
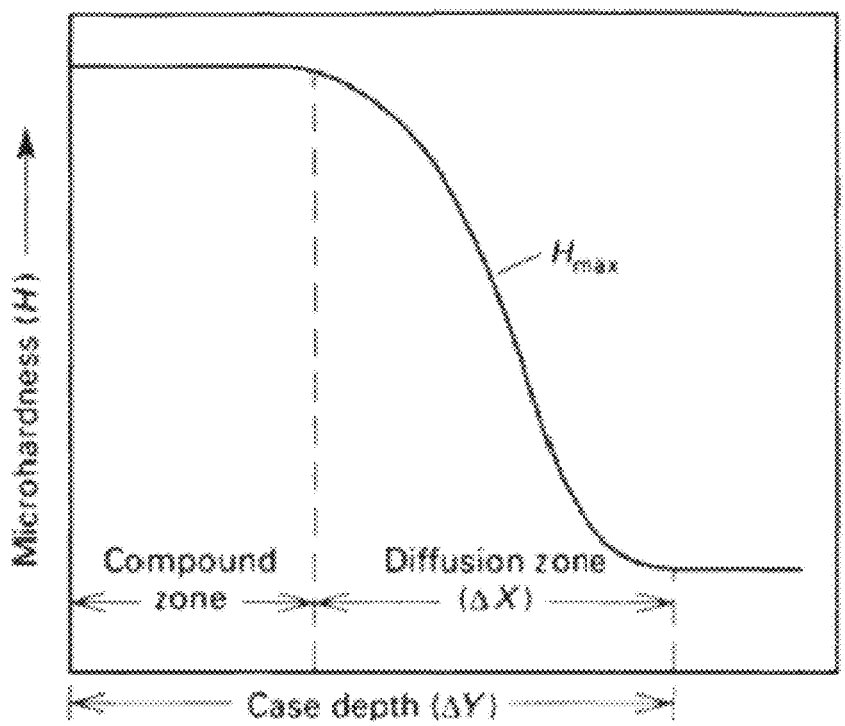
FIG. 5 shows a hardness profile for a substrate treated with ion nitriding according to the present invention.

Ion nitriding of a substrate produces a layer of hardened material, the hardness curve of which is illustrated in FIG. 5 as a function of depth (ASM Handbook, Vol. 4, Heat Treating, ASM International, 1991). Said hardened layer comprises a diffusion zone and may—or may not—include a compound zone. This depends upon type and content of alloy elements in the substrate, temperature and treatment time, as well as upon the mechanism used for the generation of nitrogen. The hardness of the compound zone is not affected by the alloy elements, while the hardness of the diffusion zone is governed by the nitride-forming elements: Al, Cr, Mo, Ti, V and Mn. $\Delta X$ in the curve depends on the type and concentration of the alloy elements, while $\Delta Y$ in the curve grows with temperature and decreases with the concentration of alloying elements. In view of these facts, it turns out that the accurate selection of the base steel is crucial, and that said steel should have a minimum, appropriately selected, alloying content.

In a base steel, the original nitrogen ($N_2$) is in solution within positions of the crystal lattice or as interstitial nitrogen, up to the solubility limit of Fe (0.4% by weight). If the $N_2$ content is increased, coherent precipitates are formed, both at the grain boundaries and within the matrix i.e. interior of the grains. These precipitates, iron nitrides and other metals, distort the lattice, generating dislocations and thus, increasing the material hardness.

This means that the nitrides formed by combining $N_2$ with the alloying elements of the steel, because of being insoluble in the ferrite matrix, are precipitated right after their formation in a state of great dispersion, and the strain they cause to the crystal lattice is responsible for the hardening because it prevents the movement of dislocations. This phenomenon is known as precipitation hardening.

In fine dispersions, ideally considered as randomly dispersed spheres within the matrix, there is a relationship between the achievable yield strength ($\sigma Y$) and the dispersion parameters (ASM Handbook, Vol. 4, Heat Treating, ASM International, 1991) as follows:

$$\sigma Y = \sigma 0 + \frac{T}{b \cdot A/2}$$

where $\sigma 0$ is the yield strength of the matrix, T is the line tension of a dislocation, b is the Burgers vector thereof and A is the spacing between particles. This result arises from the analysis of the movement of dislocation around dispersed particles, showing that the lower the spacing in precipitated particles, the higher the hardening.

The compound zone is a region wherein two types of intermetallic compounds are formed: $\gamma'$ ($Fe_4N$) and $\varepsilon$ ($Fe_{2-3}N$). Carbon (C) promotes the formation of $\varepsilon$, whereby if the formation of this compound is promoted, methane gas ($CH_4$) is incorporated to the ionizing chamber. Hydrogen ($H_2$) tends to promote the formation of $Fe_2N$. This layer of compounds, known as "white layer" due to its appearance upon metallography, is very hard and very fragile, and is characterized by a weak bond between phases, and different thermal phase expansion coefficients, a situation that should be taken into account when designing the treatment and performance thereof.

In ion nitriding, carried out directly with $N_2$ (as opposed to gas nitriding, where $NH_3$ is used) it is possible to control whether or not the above described white layer exists. Given the layer characteristics of low toughness and the mechanical strength of the piece at service, it is sought in the plunger of the present invention to avoid the formation of the so-called "white layer" in the surface treatment to be implemented, thus, the use of ion nitriding is optimal in this sense.

Ion nitriding ($N_2$-based) shows some advantages over gas nitriding ($NH_3$-based), such as:
- possibility of selecting a monophasic layer $\varepsilon$ or $\gamma''$ or directly avoiding the formation of the white layer,
- higher control over the thickness of the hard layer,
- lower treatment temperatures,
- lower distortion of the piece,
- reduced environmental pollution (due to the fact that no $NH_3$ is used),
- lower energy consumption,
- possibility of automation of the process,
- possibility of mask-coating those areas which are not to be nitrided.

Figure 6:
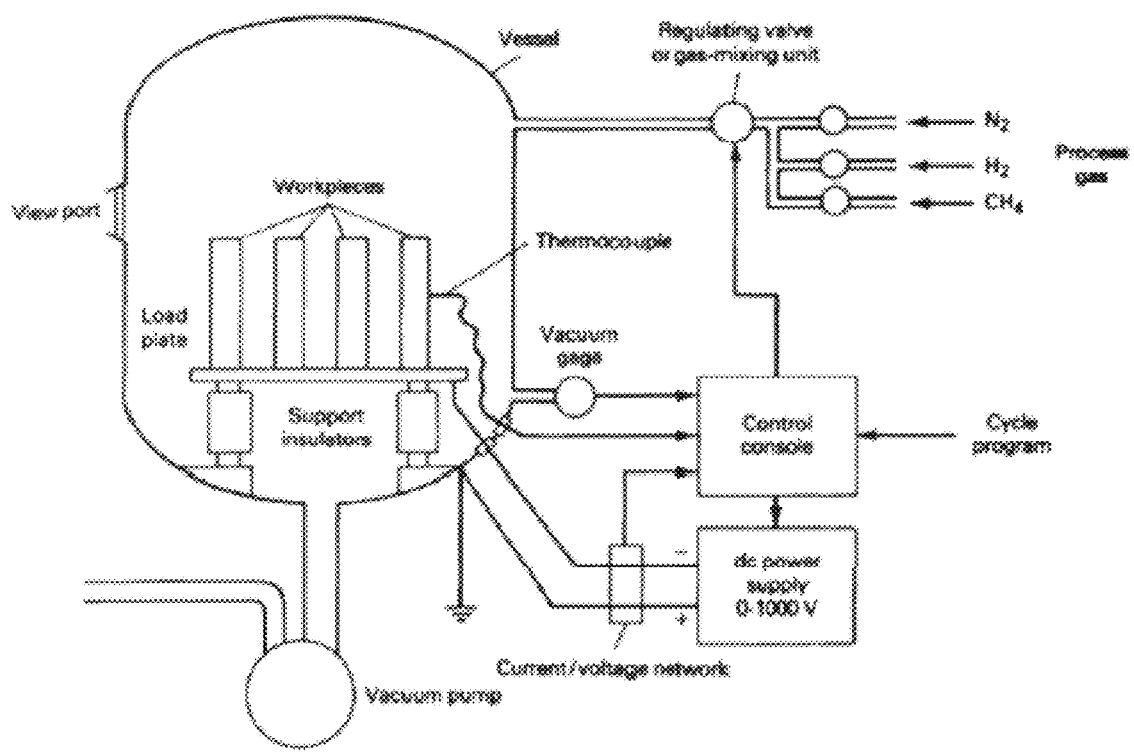
FIG. 6 is a schematic view of a typical installation for ion nitriding metallic articles used for carrying out the present invention.

A facility for performing a nitriding process according to a preferred embodiment of the present invention is illustrated schematically in FIG. 6 (ASM Handbook, Vol. 4, Heat Treating, ASM International, 1991, pg. 421). Said process comprises the steps of:
1. placing the pieces to be nitrided, in this case the alloyed steel-plungers of an embodiment of the present invention, inside a nitrurating chamber (oven), on top of and in contact with a conductor plate connected to one of the terminals of an electrical source. The pieces are first subjected to an Argon ion sputtering surface cleaning process. Following said cleaning process an atmosphere comprising $N_2$ and $H_2$, and optionally $CH_4$, is circulated into the chamber and a dynamic vacuum (about 5hPa) is established.
2. bringing said chamber to a pressure of about 0.1 mmHg;
3. heating the pieces until they reach a temperature of between about 375° C. and about 700° C. The heat is produced by electrical resistance heaters and by the ion bombardment itself;
4. establishing a potential difference between the pieces and the chamber (oven) enclosure of between about −500 V and about −1000 V (the enclosure of the chamber (oven) is at potential 0 due to grounding). This creates plasm that dissociates $N_2$ forming $N^-$ ions that impact on the pieces, which act as the cathode.

The ion nitriding layer obtained by this process has an HRC Rockwell Hardness of between 50-70 and a thickness of between 75 μm up to 0.75 mm, as required. The surface of the plunger, following the nitriding process, is mirror-polished.

In a preferred embodiment of the present invention, following the ion nitriding process, the plunger may be subjected to an additional surface treatment such as PVD of atoms, ions, molecules. There are mainly three application techniques for PVD coatings: thermal evaporation, sputtering and ion-plating. Thermal evaporation implies heating of the material until a vapor is formed that condenses on the substrate and forms the coating. Sputtering implies the generation of a plasm between particles of the coating and the substrate, while ion-plating combines both the first and the second techniques.

The PVD process for providing a coating to the plunger of the preferred embodiment of the present invention comprises the steps of:
1. synthesis of the material to be deposited (condensed state transition, solid or liquid to a vapor phase, or reaction between components of the compound to be deposited),
2. vapor transport from the source to the substrate, and
3. vapor condensation followed by a nucleation and growth process.

The resulting PVD coating layer is a layer of about 3-5 μm thick, which provides a hardness of about 3000 HV.

Thus, in a preferred embodiment of the present invention, a plunger is provided that combines the aforementioned techniques, said plunger comprising:
 an alloyed base steel, such as AISI H13, DIN 34CrAlNi 7 or SAE-AISI 4140,
 a surface treatment by ion nitriding,
 a PVD deposition treatment.

Figure 9:
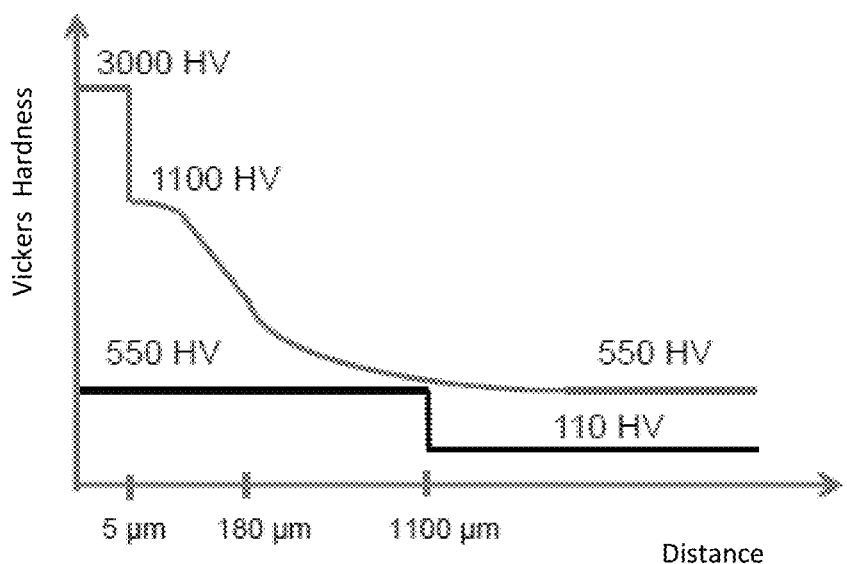
FIG. 9 shows a comparison between hardness profiles of a prior art plunger and a plunger according to an embodiment of the present invention.
Figure 10:
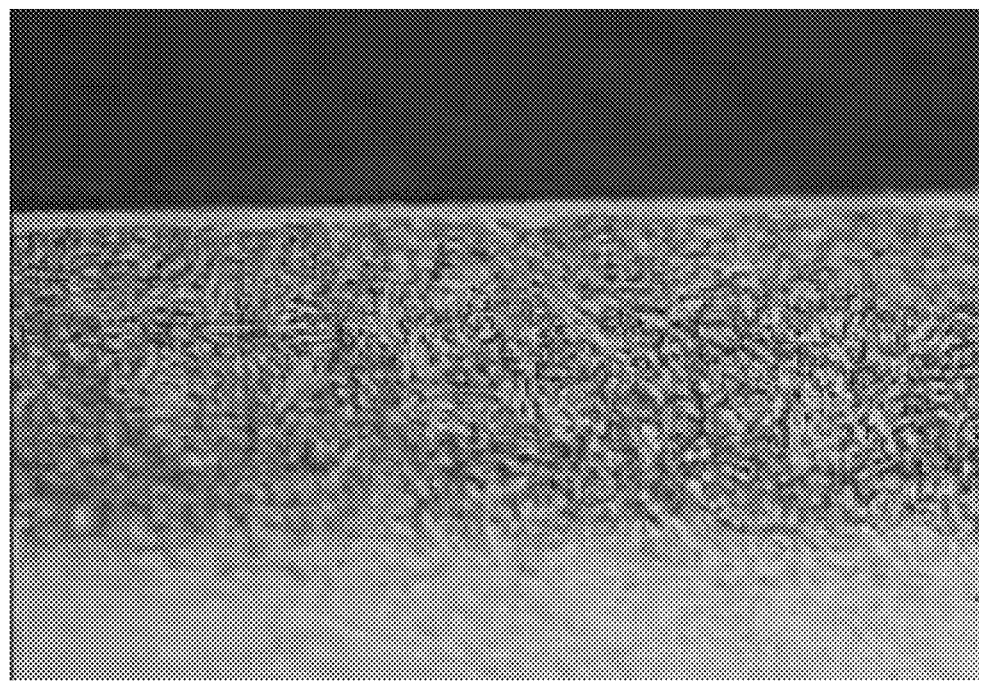
FIG. 10 is a magnified microphotograph of a polished sample of a plunger according to a preferred embodiment of the present invention.

This selection of material and treatments results in a plunger with a substrate and structure as shown in FIG. 10, having high surface hardness, but without the defects derived from metallurgic discontinuity, grain growth and adherence deficiencies of the HVOF-treated plungers known in the art. A plunger manufactured by this process, according to a more preferred embodiment of the present invention, shows a surface hardness curve as a function of the depth as illustrated in FIG. 9, as compared to the hardness profile of the HVOF-treated plunger of the state of the art. The base metal selected, alloyed steel, shows an average hardness of 550 HV. Ion nitriding produces a diffusion zone that progressively increases hardness until reaching a value of about 1100 HV. Then, the PVD treatment creates a thin layer that further increases the surface hardness of the plunger until a hardness value near 3000 HV.

Table 1 below depicts the plunger properties according to a preferred embodiment of the present invention, in terms of the base material, the ion nitriding treatment and the PVD treatment, as compared to an HVOF-treated plunger of the state of the art. As it may be appreciated therefrom, the enhanced hardness of the plunger of the invention is higher in all aspects in relation to the hardness of the plunger of the state of the art.

TABLE 1

|  | Plunger of the state of the art (HVOF) | A plunger of the present invention (AISI H13, ion nitriding, PVD) |
| --- | --- | --- |
| Base Material | 121 HV | 550 HV |
| Hard diffusion layer | — | 1100 HV (layer thickness: 180 μm) |
| Hard surface layer | 567 HV (1000 μm) | 3000 HV (layer thickness: near 5 μm) |
| Chemical feature of the layer | Heterogeneous | Homogeneous |

In conclusion, the plunger of the present invention shows the following advantages over the plungers used in the art:
 higher surface hardness,
 reduced surface roughness,
 transition between hard layer and core is of the gradual type, i.e. there is a metallurgic continuity, given by the hardness profile due to a diffusion structure,
 no adherence deficiencies of the substrate to the hard layer, and
 homogeneous layer, without zones having absence of hard material.

Unless otherwise indicated, it should be understood that all numbers expressing quantities of components, process conditions, concentrations, properties, etc. used in the specification and claims are modified in all instances by the term "approximately".

The preferred embodiments and examples disclosed in the specification should not be construed as limiting the invention; they are included solely with explanatory and illustrative purposes for a better understanding of the invention, the scope of which is given by the appended claims.

The invention claimed is:

1. A plunger for a hydraulic fracturing pump, wherein the plunger is a steel plunger treated with an ion nitriding process, wherein the steel is selected from the group comprising AISI H13 steel, DIN 34CrAlNi 7 steel, SAE-AISI 4000 series steel or an equivalent alloyed steel having at least molybdenum.

2. The plunger according to claim 1, wherein the SAE-AISI 4000 series steel is a SAE-AISI 4140 steel.

3. The plunger according to claim 1, wherein the steel is a quenched and tempered steel.

4. The plunger according to claim 1, wherein the steel is quenched and subjected to a double-tempering treatment.

5. The plunger according to claim 1, wherein the plunger is further subjected to physical vapor deposition (PVD) surface treatment.

6. The plunger according to claim 5, wherein the PVD coating is about 5 μm thick.

7. The plunger according to claim 6, wherein the PVD coating is a monolayer coating of elements selected from the group comprising Al, Cr and Ni.

8. The plunger according to claim 5, wherein the PVD coating is a monolayer coating of elements selected from the group comprising Al, Cr and Ni.

9. A method for manufacturing a plunger for a hydraulic fracturing pump, where the method comprises carrying out a surface treatment of a steel plunger by means of an ion nitriding process, wherein the steel is selected from the group comprising AISI H13 steel, DIN 34CrAlNi 7 steel, SAE-AISI 4000 series steel or an equivalent alloyed steel having at least molybdenum.

10. The method according to claim 9, wherein the SAE-AISI 4000 series steel is a SAE-AISI 4140 steel.

11. The method according to claim 9 wherein the steel plunger is further subjected to a double-tempering treatment.

12. The method according to claim 9 wherein following the ion nitriding process, the piston is subjected to a PVD surface treatment.

13. The method according to claim 12 wherein the PVD coating is about 5 µm thick.

14. The method according to claim 13 wherein the PVD coating is a monolayer coating of elements selected from the group comprising Al, Cr and Ni.

15. The method according to claim 12 wherein the PVD coating is a monolayer coating of elements selected from the group comprising Al, Cr and Ni.

* * * * *